Nov. 12, 1963  H. J. GERBER  3,110,106
DATA READING APPARATUS
Filed Oct. 23, 1958  6 Sheets-Sheet 1
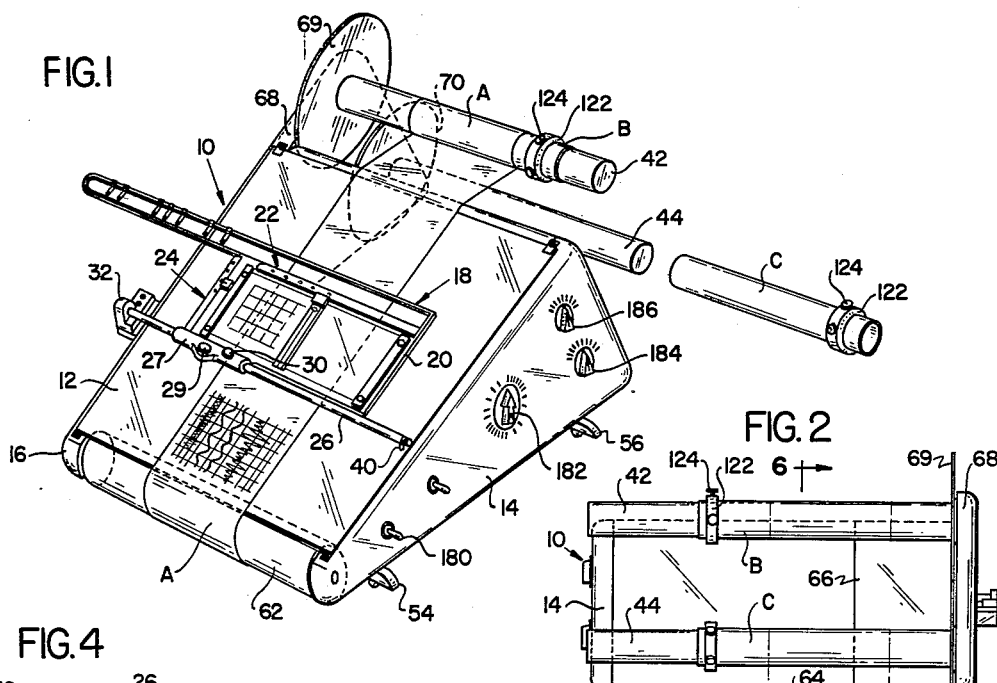
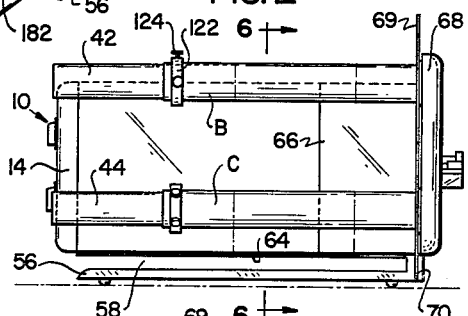
INVENTOR.
HEINZ JOSEPH GERBER
BY Teller + McCormick
ATTORNEYS Nov. 12, 1963   H. J. GERBER   3,110,106
DATA READING APPARATUS
Filed Oct. 23, 1958   6 Sheets-Sheet 2

INVENTOR.
HEINZ JOSEPH GERBER
BY Teller & McCormick
ATTORNEYS

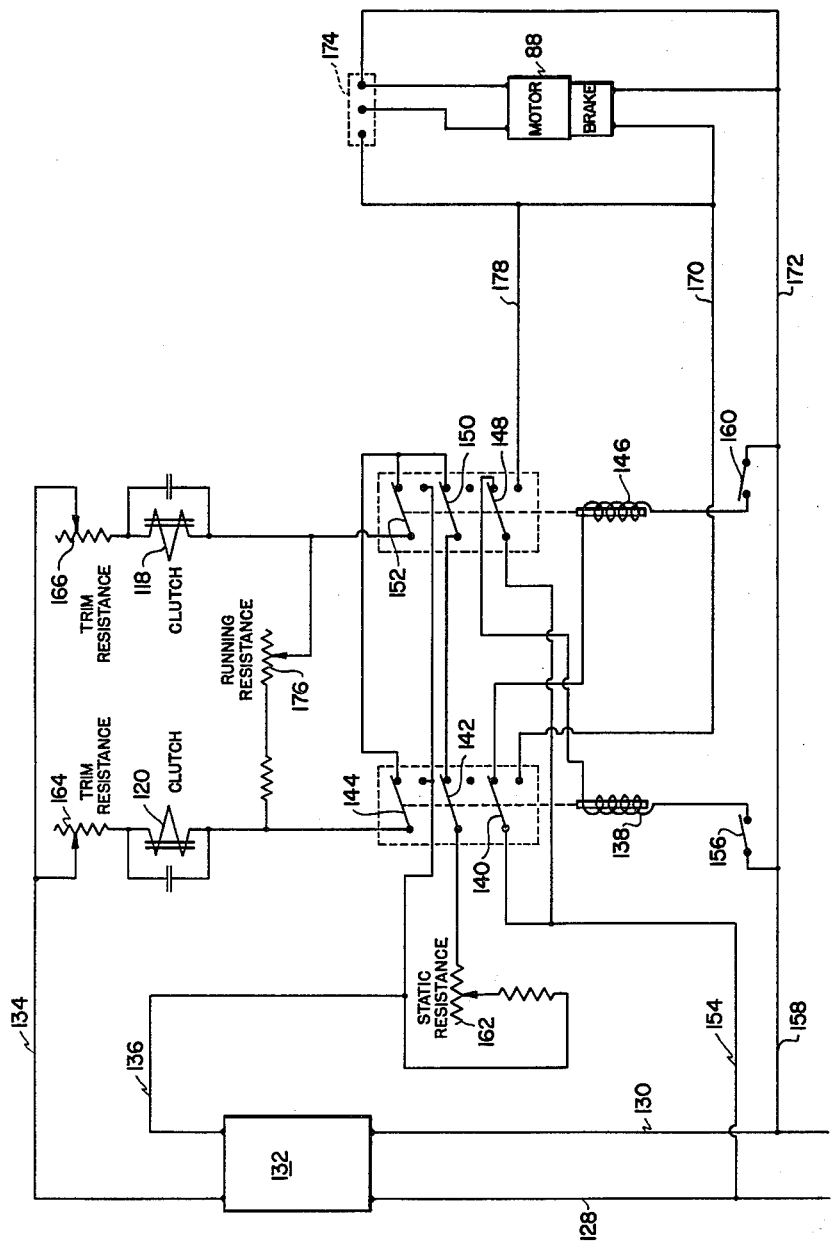

Nov. 12, 1963

H. J. GERBER 3,110,106

DATA READING APPARATUS

Filed Oct. 23, 1958

INVENTOR.
HEINZ JOSEPH GERBER
BY Teller & McCormick
ATTORNEYS

Nov. 12, 1963  H. J. GERBER  3,110,106
DATA READING APPARATUS
Filed Oct. 23, 1958  6 Sheets—Sheet 5
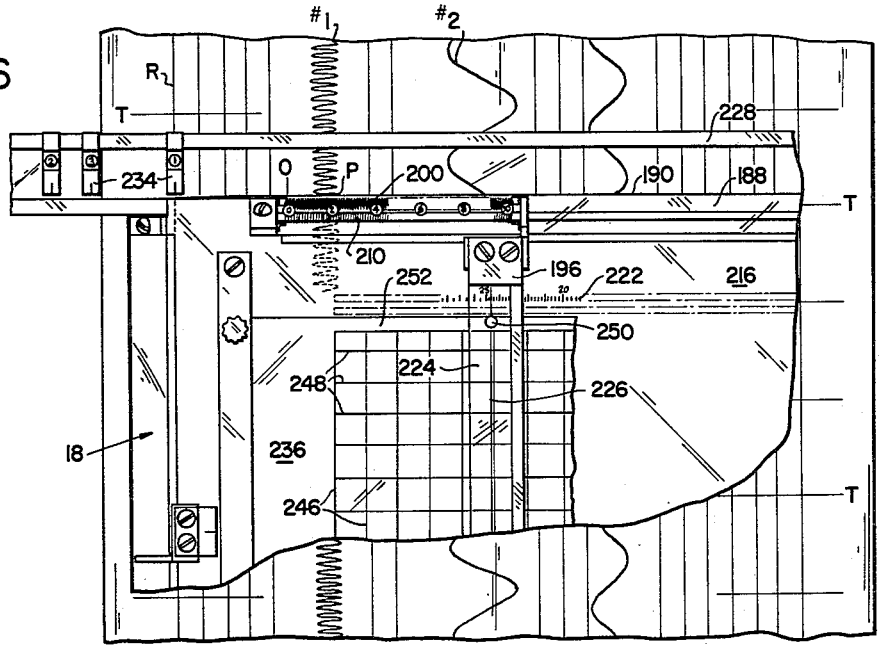
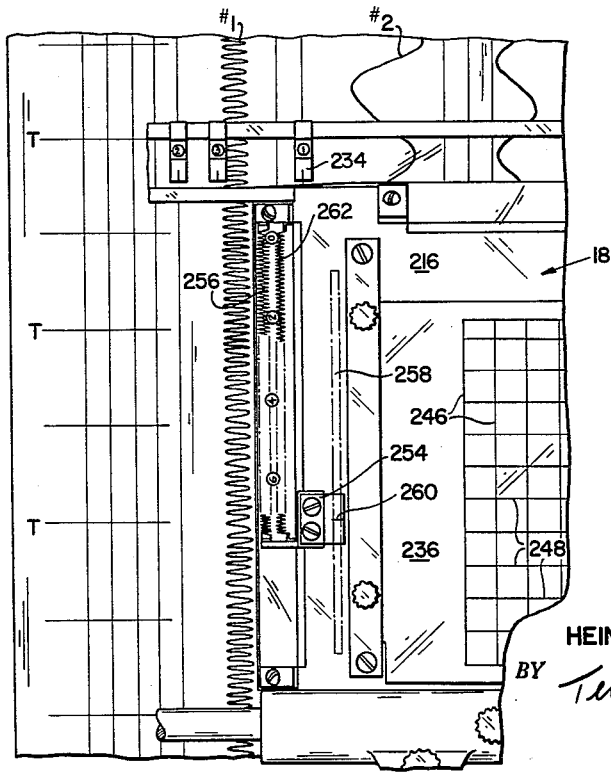
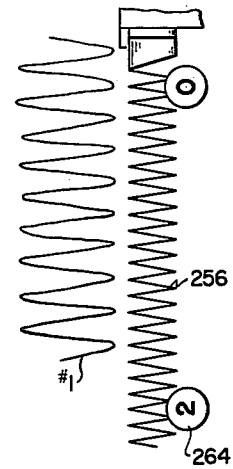
*INVENTOR.*
HEINZ JOSEPH GERBER
BY Teller & McCormick
ATTORNEYS Nov. 12, 1963  H. J. GERBER  3,110,106
DATA READING APPARATUS
Filed Oct. 23, 1958  6 Sheets-Sheet 6

INVENTOR.
HEINZ JOSEPH GERBER
BY
ATTORNEYS 3,110,106
DATA READING APPARATUS
Heinz Joseph Gerber, Hartford, Conn., assignor to The Gerber Scientific Instrument Company, South Windsor, Conn., a corporation of Connecticut
Filed Oct. 23, 1958, Ser. No. 769,176
7 Claims. (Cl. 33—1)

The invention relates to a data reading apparatus, and such an apparatus embodying the invention is primarily intended and adapted for conveniently and accurately reading the amplitudes and frequencies of one or more record traces on an oscillogram. The oscillogram or oscillogram sheet may have, and ordinarily does have, two or more generally parallel longitudinal traces each of which represents varying values recorded by an oscillograph. The values recorded in the respective traces may be of various kinds, such as electrical characteristics or pressures or vibrations or the like. An apparatus embodying the invention includes a plate or body for supporting or holding an oscillogram or oscillogram sheet in a fixed position and includes a device or head which is above the plate or body and above an oscillogram sheet thereon and which has one or more instrumentalities for reading or measuring the amplitudes of traces or the frequencies thereof or both.

One object of the invention is to provide mechanism associated with the supporting plate or body for guiding the movement of the reading or measuring head into a suitable operative position.

Another object of the invention is to provide means enabling a long oscillogram sheet or strip to be readily placed upon or removed from the supporting body.

Another object of the invention is to provide improved manually controlled means for quickly moving a long oscillogram strip along the plate or body to locate a selected portion or zone of said strip within the operative ranges of said reading or measuring head.

A further object of the invention is to provide an instrumentality on the head for reading the amplitudes of traces and an instrumentality on the same head for reading the frequencies of the same traces.

A still further object of the invention is to provide means for conveniently locating the head transversely in proper positions for reading the amplitudes of selected traces.

A still further object of the invention is to provide a means which is adjustable in accordance with a known scale factor for the amplitudes of any particular trace and which enables the user to directly read the actual amplitude value for any selected point on said trace.

A still further object of the invention is to provide means which is associated with the said scale factor means and which enables the user to directly read said amplitude values in accordance with a nonlinear scale factor.

A still further object of the invention is to provide certain mechanical features for said amplitude and frequency instrumentalities which are advantageous and convenient.

Still other objects of the invention will be apparent from the drawings and from the following description.

The drawings show one embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a perspective view of an apparatus embodying the invention and adapted for reading data on an oscillogram.

FIG. 2 is a rear view with certain parts omitted.

FIG. 3 is a right side view.

FIG. 4 is an enlarged fragmentary sectional view taken along the line 4—4 of FIG. 3.

FIG. 5 is a plan view of an alternative mechanism which has or may have the same data reading head shown in FIG. 1, but which has an alternative means for supporting an oscillogram.

FIG. 9 is a diagram of electrical connections.

FIG. 10 is an enlarged top view of the reading head shown in FIGS. 1, 3 and 5, this view looking in the direction of the arrows 10, 10 in FIG. 3.

FIG. 11 is an enlarged fragmentary perspective view taken in the direction of the arrows 11, 11 in FIG. 10.

FIG. 12 is an enlarged fragmentary plan view of the upper central portion of the reading head.

FIG. 13 is a fragmentary sectional view taken along the line 13—13 of FIG. 10.

FIG. 14 is an enlarged fragmentary view of the transverse scales shown in FIG. 10.

FIG. 15 is an enlarged fragmentary view of the longitudinal scale shown in FIG. 10.

FIG. 16 is a schematic view showing an oscillogram with the reading head thereon, this view illustrating the manner of use for measuring the amplitude of a linear trace.

FIG. 18 is a schematic view similar to FIG. 16, but illustrating the manner of use for measuring frequency.

FIG. 19 is an enlarged view of a portion of FIG. 18.

Figure 6:
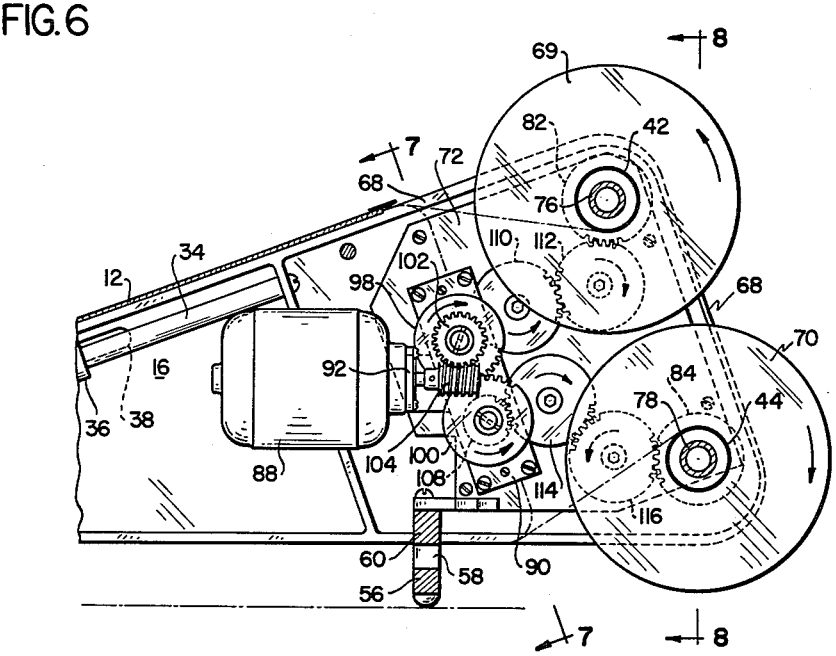
FIG. 6 is an enlarged fragmentary sectional view taken along the lines 6—6 of FIGS. 2 and 8.

*Data Reader Shown in FIGS. 1 to 4*

Referring more particularly to FIGS. 1 to 4 of the drawings, an apparatus embodying the invention includes a main body 10 having an upper wall or plate 12 which is adapted to support an oscillogram strip A. The plate 12 has an upwardly exposed face which the strip A engages, and the strip is suitably held in fixed position in said face during readings.

As shown in said FIGS. 1 to 4, the body 10 includes two plates 14 and 16 which are rigidly connected with each other by suitable means not fully shown. The side plates 14 and 16 support the top plate 12, said side plates preferably being so formed that the top plate is inclined downwardly and forwardly.

A reading head, generally indicated at 18, is located on the body 10 above the plate 12 and above the strip A on said plate. The head 18 includes a frame 20 provided with a first instrumentality 22 for reading the amplitudes of an oscillogram trace and a second instrumentality 24 for reading the frequency of an oscillogram trace. These instrumentalities may be widely varied as to details, and one reading head embodying the invention is hereinafter fully described. In general the first instrumentality 22 includes an element movable relatively to the frame 20 and having a portion registrable with a portion of the oscillogram trace to measure the transverse distance from a known zero position; and the second instrumentality 24 includes an element movable relatively to the frame 20 and having a portion registrable with successive cycles of the oscillogram trace to measure the number of cycles per unit of longitudinal distance.

The oscillogram strip A, when located on the face of the body, that is, on the plate 12, is not radially movable for fine adjustments, and a means is therefore provided for guiding the reading head 18 for bodily movement relatively to the body 10 and the plate 12 either transversely or longitudinally or both. As shown in FIGS. 1, 3 and 4, a transverse rod 26 is located at a normally fixed level above the body face, said rod being normally parallel to said face. Rigidly secured to the frame 20 at the front thereof is a member 27 apertured to receive and fit the rod 26. Thus the rod 26 supports the front portion of the frame and guides the head 18 for transverse movement in parallelism. The rear portion of the frame rests directly upon the oscillogram sheet on the plate 12. The head 18 can be swung upwardly about the axis of the rod 26 but this is not ordinarily necessary.

For more readily moving the head along the rod 26, there may be provided a small friction wheel 28, which is best shown in FIG. 10, this wheel being rotatably mounted in the member 27 and engaging the rod 26. A manually engageable knob 29 is connected with the wheel 28 for turning it so as to move the head transversely. By means of a screw 30 the head 18 may be clamped so as to be held against transverse movement.

The rod 26 is rigidly connected at its left end with a member 32 which is guided for movement in a longitudinal direction parallel with the plate 12. As shown in FIGS. 3 and 4, a generally longitudinal rod 34 is provided which is in a fixed position parallel with the body face and which serves as a guide, this rod being preferably located within the body 10. The member 32 is connected with a rod 36 which extends into the body through a slot 38 in the body side plate 16 and is connected with a sleeve 39 on the rod 34. Thus the rod 34 supports the member 32 and the left end of the rod 26 and guides said parts for longitudinal movement in parallelism. Inasmuch as the head 18 is connected with said rod 26, said head is also guided for longitudinal movement in parallelism. Said head 18 together with the rod 26 and the member 32 are freely movable about the axis of the rod 34, such movement being upward from the position shown. The movement of said parts to a raised position facilitates the placement of an oscillogram strip A on the plate 12 and the removal of a strip therefrom. Downward movement of the rod 26 and the attached parts is limited by a button 40 at the free end of the rod 26, this button engaging the plate 12.

It will be seen that the rods 26 and 34 and the parts associated with them constitute parallel motion mechanism for guiding the reading head in its entirety for transverse and longitudinal bodily adjustments parallelly with the exposed face of the body and relatively to an oscillogram sheet or strip located in fixed position on said face so as to properly position said head for effecting the desired reading.

As shown in FIGS. 1 to 3, spools 42 and 44 are provided for the unwinding and winding of the oscillogram strip A. These spools and the operating mechanism therefor are hereinafter fully described.

Data Reader Shown in FIG. 5

As to certain of its aspects, the invention is not limited to a hollow body such as 10 or to spools such as 42 and 44 for unwinding and winding the oscillogram strip. FIG. 5 shows an alternative embodiment of the invention wherein the head 18 is or may be as before described, but wherein the body may be a single plate 46 and wherein there are no spools such as 42 and 44 for unwinding and winding. The plate 46 is adapted to support a short oscillogram strip A′ or to support a portion of a longer oscillogram strip. The strip A′ may be held in place by pressure sensitive tape. The plate 46 corresponds in function to the plate 12.

As shown in FIG. 5, there is provided a transverse rod 48 similar to the rod 26, the head 18 being similarly connected to said rod. The rod 48 is rigidly connected at its left end to a member 50 guided for longitudinal movement along a rod 52 carried by the plate 46. The rods 48 and 52 and their associated parts function as previously described in connection with the rods 26 and 34. Additional description is unnecessary.

Strip Moving and Holding Mecahnism— FIGS. 1 to 3 and FIGS. 6 to 9

The oscillogram strip A is ordinarily quite long and it is preferably initially wound on a core from which it is unwound as reading is effected. As the strip A is unwound from one core, it is preferably wound upon another core. The cores are carried by the before-mentioned spools 42 and 44. Said cores are designated B and C and they are sometimes hereinafter referred to as the "first" and "second" cores. The two cores are preferably tubular and they may conveniently be paperboard tubes.

The two spools 42 and 44 and the cores B and C thereon are preferably so held that they are rotatable about fixed transverse axes. The strip A as it is unwound from the first core and is wound onto the second core is movable longitudinally, ordinarily forwardly, across the front face of the body plate 12. For convenience of use and for simplicity of construction, it is preferable to locate both spools at the rear of the body 10 and in superposed relationship. The strip A extending from the first core B on the spool 42 may pass forwardly over said upwardly exposed face of the body and downwardly at the front of the body and rearwardly along the bottom of the body and then to the second core B on the spool 44. The strip A in the described relationship substantially surrounds the body.

In order that the strip A may be readily placed in or removed from its position surrounding the body 10, cantilever means is provided for supporting said body solely at one longitudinal side, that is, the left side as viewed in FIG. 1 or the right side as viewed in FIG. 2. The cantilever support for the body results in unobstructed space around the body except at said side so that an oscillogram strip may be freely moved toward the stated longitudinal side and into its described relationship with the body. Preferably there are two similar transverse supports 54 and 56 which are engageable with the top face of a table or the like and the before-mentioned cantilever supporting means is connected with these supports so that there is a free space 58 between the supports and the body. This space makes it possible for the oscillogram strip A to be easily placed in its described relationship with the body or to be removed therefrom, and it also enables the strip to freely move along the bottom of the body.

The two side plates 14 and 16 of the body are rigidly connected with each other by suitable means not fully shown. This means includes connecting bars 60 formed integrally with the main supports 54 and 56. The top plate 12 which is supported on the side plates is preferably formed of glass or other transparent material. A rotatable longitudinal roller 62 is provided at the front, this roller having pintles entered in bearing apertures in the side plates. The roller 62 guides the strip A as it passes around the front of the body. A bottom plate 64 preferably extends between the side plates. A portion of the rear of the body is closed by a substantially vertical plate 66. The side plate 16 has a portion 68 which extends rearwardly substantially beyond the side plate 14 and beyond the top plate 12.

Figure 8:
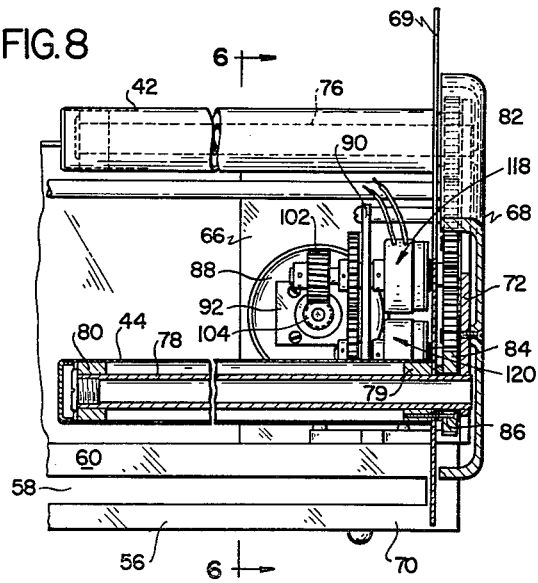
FIG. 8 is a fragmentary sectional view taken along the line 8—8 of FIG. 6.

The spools 42 and 44 which support the cores B and C have cantilever support at the same side as the cantilever support of the body 10, that is, the left side as viewed in FIG. 1 or the right side as viewed in FIGS. 2 and 8. This cantilever support for the spools 42 and 44 makes it possible for the strip A and the cores B and C to be all put in place and removed at the same side of the apparatus. Preferably, the spools 42 and 44 are hollow or tubular and said spools include discs 69 and 70 at the supported ends of said spools.

Figure 7:
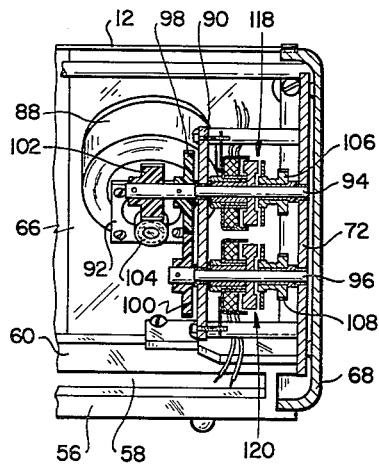
FIG. 7 is a fragmentary sectional view taken along the line 7—7 of FIG. 6.

For supporting the spools 42 and 44 and for other purposes, a vertical longitudinal plate 72 is fixedly connected with the side plate 16 and more particularly with the extension 68 thereof, this plate being best shown in FIGS. 7 and 8. Fixedly connected with the plate 72 and projecting therefrom toward the left are two preferably tubular spool supports 76 and 78 which are within the hollow or tubular portions of said spools 42 and 44. The spools are rotatable on their said supports and bearing bushings 79, 80 are interposed between each spool and its support. The spools 42 and 44 may be rotated by power, and for this purpose two gears 82 and 84 are provided. The gears 82 and 84 are respectively rotatable on the supporting tubes 76 and 78 and they are fixedly connected with said spools. As shown in FIG. 8, screws 86 extend through each gear 82 and 84 and through the corresponding disc 69 or 70 and into the corresponding bearing bushing 79.

A variable speed electric motor 88 is provided which serves by means of suitable gearing to rotate the gears 82 and 84 and to thus rotate the spools 42 and 44 for moving the strip A forwardly or rearwardly as required. A brake is preferably incorporated in the motor and this brake serves to quickly stop the motor upon the opening of a motor control switch.

As shown, a vertical longitudinal plate 90 is fixedly connected with the plate 72 and spaced therefrom, and the motor 88 is supported by means of a bracket 92 attached to said plate 90. Rotatable in suitable bearings in the plates 72 and 90 are two transverse shafts 94 and 96. These shafts extend beyond the plate 90 and gears 98 and 100 are secured to the shafts, said gears meshing with each other. The upper shaft 94 extends additionally and carries a worm gear 102 which meshes with a worm 104 on the shaft of the motor 88. It will be seen that when the motor is energized, the two shafts 94 and 96 are rotated in opposite directions.

Gears 106 and 108 are mounted on the shafts 94 and 96 and are relatively rotatable thereon. The upper gear 106 is connected by means of idler gears 110 and 112 with the gear 82 on the upper spool 42. The lower gear 108 is connected by means of idler gears 114 and 116 with the gear 84 on the lower spool 44. A clutch 118, preferably electromagnetic, is mounted on the shaft 94, this clutch having two relatively movable elements. One element of the clutch is connected with said shaft 94 and the other element is connected with the gear 106. A similar second clutch 120 is mounted on the shaft 96, this clutch having one element connected with said shaft 96 and having the other element connected with the gear 108.

The two elements of each of the clutches 118 and 120 are relatively movable. The shaft connected element is the driving element and the gear connected element is the normally driven element. When said clutch is fully engaged, the driven element is frictionally rotated in unison with the driving element, but when the clutch is only partly energized the friction is less and the driven element may yield or slip relatively to the driving element so that torque is transmitted to said driven element without uniformity of rotation. When the motor 88 is running, the worm gear 102 and the driving element of the clutch 118 are rotated in the clockwise direction as viewed in FIG. 6. At the same time, the driving element of the clutch 120 is rotated in the counterclockwise direction.

When an oscillogram strip A is to be viewed and read, it is initially wound on a core B and its leading end is attached to a core C. A sufficient length of the strip A is unwound from the core B to reach around the body 10, and then the two cores and the strip are put in place, the cores respectively engaging the spools 42 and 44 and the strip being at the top and front end and bottom of the body. With the strip in place one of the cores is manually turned to take up slack.

Each core B or C has a length greater than the width of the strip, and a portion of the core therefore projects beyond the strip. The projecting portion of each core is fastened to the corresponding spool, and for this purpose there is preferably provided for each core a ring 122 which is best shown in FIG. 1 and which surrounds said projecting portion of said core. The ring 122 has one or more screws 124 entered in radial threaded holes therein. Said screws engage the core and, upon being turned, they serve to clamp the core against the spool for rotation therewith.

When the clutch 120 is energized to rotate the gear 108 counterclockwise, as shown in FIG. 6, the idler gear 114 is rotated clockwise and the idler gear 116 is rotated counterclockwise and the gear 84 and the spool 44 and the core C are rotated clockwise. This last said clockwise direction winds the strip A on the core C, said strip being unwound from the core B. Thus the strip A is moved forwardly along the plate 12.

When the clutch 118 is energized or partly energized, it tends to rotate the gear 106 clockwise, the idler gear 110 tends to rotate counterclockwise and the idler gear 112 tends to rotate clockwise and the gear 82 and the spool 42 and the core B tend to rotate counterclockwise. If the clutch 118 is only partly energized, the tendency of the spool 42 and the core B to rotate counterclockwise for winding is overcome by the fully energized clutch 120 which rotates the spool 44 clockwise for winding. The net result is that the strip A is wound on the core C and is unwound from the core B, but is so unwound under tension resulting from the frictional torque action of the clutch 118. If the conditions are reversed, that is, if the clutch 118 is fully energized and the clutch 120 is only partly energized, the strip A is wound on the core B and is unwound from the core B under tension resulting from the frictional torque action of the clutch 120. Thus the strip is moved rearwardly or toward the rear along the plate 12.

The operator, by fully energizing one clutch while leaving the other partly energized, can move the strip A in either direction to expose any portion or zone thereof on the plate 12 in the proper position for convenient viewing and reading. When the strip is in the desired position, the motor is stopped and both clutches continue to be partly energized. The brake incorporated in the motor prevents any overrunning thereof. The partly engaged clutches together with the worm and wheel connection with the idle motor prevent any movement of the strip.

When a portion or zone of the oscillogram strip A that is to be read is properly located on the plate 12, the reading is effected by the instrumentalities on the head 18, as hereinbefore briefly described and as hereinafter more fully described. As has been stated, the plate 12 is preferably transparent. A lamp 125 is provided for illuminating the strip A from below. This lamp is within the body 10 and is preferably mounted on the bottom plate 64.

Referring particularly to the electrical diagram in FIG. 9, two alternating current power leads 128, 130 are provided. Said leads are connected with a rectifier network generally indicated at 132, and direct current leads 134 and 136 extend from said network.

A relay 138 is provided having three movable switch members 140, 142, 144. A similar relay 146 is provided also having three movable switch members 148, 150, 152. When the several switch members are in their upper positions as shown, the following circuits are established or partly established.

A circuit through the coil of the relay 138 is partly established from the lead 128 through a conductor 154 and the switch member 148, this circuit being completed upon the closing of a normally open manually operable switch 156 connected with the lead 130 by means of a conductor 158. A circuit through the coil of the relay 146 is partly established through said conductor 154 and the switch member 140, this circuit being completed upon the closing of a normally open manually operable switch 160 connected with the said conductor 158.

A circuit through the coil of the clutch 120 is established from the lead 136, through an adjustable resistance 162, through the switch members 142 and 150, through the switch member 144, through said clutch coil and through an adjustable resistance 164 connected with the lead 134. A similar circuit through the coil of the clutch 118 is established, through said resistance 162, through said switch members 142 and 150, through the switch member 152, through said clutch coil and through an adjustable resistance 166 connected with the lead 134. The resistance 162 is sometimes herein referred to as the "static" resistance. The last described circuits partially energize the clutches, the partial energization being due to the fact that the resistance 162 is included in said circuits. Inasmuch as the motor 88 is not running, the clutches 120 and 118 merely serve to prevent rotation of the spools 42, 44 and the cores thereon.

When the switch 156 is closed to energize the relay 138, the switch members 140, 142, 144 are moved to their lower positions. The switch member 140 in so moving breaks the circuit through the coil of the relay 146 and thus prevents said relay from being energized even if the switch 160 were closed. At the same time the switch member 140 establishes a circuit through a conductor 170 to start the motor 88, the motor circuit being completed by a conductor 172 connected with said conductor 158. Thus, the operation of the motor is started. Said conductors 170 and 172 are connected with a variable speed controller 174 which can be manually adjusted to change the speed of the motor.

The switch member 142 in moving to its lower position breaks the described circuit through the clutches 120 and 118. The switch member 144 in moving to its lower position also breaks the described circuit through the clutch 120, but it establishes a new circuit through said clutch which new circuit does not include the resistance 162. Thus the clutch 120 is fully energized but the exact extent of energization can be changed by means of the adjustable resistance 164. The initially described circuit through the clutch 118 has been broken by the movement of the switch member 142, but a new circuit through the clutch 118 is now established through an adjustable resistance 176. The resistance 176 is herein sometimes referred to as the "running" resistance.

As the result of the described connections, the clutch 120 is fully energized and the clutch 118 is partially energized. Thus the clutch 120 rotates the spool 44 and the core C thereon in the clockwise direction to wind the strip A on said core C, the strip being unwound from the spool 42 and the core B. However, the clutch 118 is partially energized and it tends to rotate the spool 42 and the core B in the counterclockwise direction to wind the strip A on said core B. The clutch 118 does not actually turn the spool 42 and it serves merely to resist the clockwise rotation resulting from the tension in the strip A. The action of the partially energized clutch 118 thus serves to maintain a suitable tension in the strip as it is unwound. The amount of this tension can be changed by adjusting the resistance 176. The last above-described winding and unwinding action continues as long as the switch 156 is held closed, and the strip A can be moved forwardly to any desired extent. When the switch 156 is permitted to open, the motor 88 is instantly stopped and the strip A is held against further movement.

When the switch 160 is closed to energize the relay 146, the switch members 148, 150, 152 are moved to their lower positions. The switch member 148 in so moving breaks the circuit through the coil of the relay 138 and thus prevents said relay from being energized even if the switch 156 were closed. At the same time the switch member 148 establishes a circuit through a conductor 178 to start the motor 88, said conductor 178 being alternative to the conductor 170. Thus the operation of the motor is started.

The switch member 150 in moving to its lower position breaks the described circuit through the clutches 120 and 118. The switch member 152 in moving to its lower position also breaks the described circuit through the clutch 118, but it establishes a new circuit through said clutch which new circuit does not include the resistance 162. Thus the clutch 118 is fully energized but the exact extent of energization can be changed by means of the adjustable resistance 166. The initially described circuit through the clutch 120 has been broken by the movement of the switch member 150, but a new circuit through the clutch 120 is now established through the before-mentioned adjustable resistance 176.

As the result of the described connections, the clutch 118 is fully energized and the clutch 120 is partially energized. Thus the clutch 118 rotates the spool 42 and the core B thereon in the counterclockwise direction to wind the strip A, the strip being unwound from the core C. However, the clutch 120 is partially energized and it tends to rotate the spool 44 and the core C in the clockwise direction to wind the strip A on said core C. The clutch 84 does not actually turn the spool 42 and it serves merely to resist the counterclockwise rotation resulting from the tension in the strip A. The action of the partially energized clutch 120 thus serves to maintain a suitable tension in the strip as it is unwound. The amount of this tension can be changed by adjusting the resistance 176. The last above-described winding and unwinding action continues as long as the switch 160 is held closed, and the strip A can be moved rearwardly to any desired extent. When the switch 160 is permitted to open, the motor 88 is instantly stopped and the strip A is held against further movement.

By operating the switches 156 and 160 as described, the operator of the apparatus can move the strip A in either direction, so as to centrally locate on the transparent plate 12 those portions of the oscillogram traces on said strip that are to be viewed and read. The strip is always under suitable tension, this tension being constant irrespective of the direction of strip movement. This constant tension can be changed by adjusting the resistance 176.

Referring particularly to FIGS. 1 and 3, 180 is a manual lever for operating both of two switches 156 and 160. By moving the lever in one direction the switch 156 can be closed for moving the strip A forwardly, and by moving the lever in the opposite direction the switch 160 can be closed for moving the strip A rearwardly. When the lever is in its central position, both switches are open and the strip A is held stationary. A knob 812 is connected with the motor controller 174, and this knob when turned adjusts the speed of the motor. A knob 184 is provided for adjusting the static resistance 162. A knob 186 is provided for adjusting the running resistance 176.

*Data Reading Head in General*

The before-mentioned reading head 18 comprises said base member or frame 20 which normally rests upon an oscillogram sheet on the body plate 12. The head is so held by the previously described parallel motion means that it is adjustable either longitudinally or transversely, and it is so held that angular movement is prevented. The adjustability of the head enables the reading instrumentalities 22 and 24 to be located as required with respect to the respective traces of the oscillogram.

The instrumentalities 22 and 24 for measuring the amplitudes and the frequencies of any trace on an oscillogram sheet may be widely varied in construction within the scope of the broader aspects of the invention. The first instrumentality 22 includes a slide manually movable or adjustable relatively to the frame 20 and provided with an element registrable with a selected point on the trace of the oscillogram, and said first instrumentality further includes means dependent upon the adjusted position of the slide for reading the transverse distance between said selected point and a zero position having a known relationship to the frame. The second instrumentality 24 includes an element manually movable or adjustable relatively to the frame 20 and having a plurality of elements respectively registrable with successive cycles of the oscillogram trace, and said second instrumentality further includes means dependent upon the adjusted position of the last said slide for reading the number of cycles per unit of longitudinal distance. The incorporation of both instrumentalities in the same head 18 greatly facilitates the complete reading of the data for any particular trace.

*Instrumentality for Measuring Amplitude—FIGS. 9 to 15*

Referring particularly to the instrumentality 22 for measuring amplitude, one form thereof having particular advantages is shown in FIGS. 10 to 14. This instrumentality is or may be very similar to the device shown in the Gerber Patent No. 2,843,935 issued July 22, 1958 and entitled Instrument for Measuring, Interpolating, Plotting and the Like. Reference is made to said patent for details of construction not herein fully disclosed.

Rigidly secured to the base member on frame 20 at the rear of the bottom portion thereof is a thin flat plate 188 having a straight rear edge 190 that extends transversely. Rigidly secured to the frame 20 and at least indirectly to the plate 188 at the left and right ends thereof are members 192 and 194. A space is provided at the rear of the frame and above the plate 188 and between the members 192, 194 for the reception of the parts to be described.

A slide 196 is provided at the front of the base and it is connected therewith for transverse movement along a guideway 197, best shown in FIG. 13. The slide 196 has a forward projection 198 which has its bottom face closely adjacent the top face of the plate 188 and its rear face is near the rear edge 190 of said plate.

A transverse extensible coil spring 200 is connected at its left end with the member 192 on the frame and is connected at its right end with the slide projection 198. When the slide 196 is moved, the length of the spring 200 is increased or decreased. The spring 200 has its convolutions uniformly spaced, the spacings between all of the convolutions being uniformly varied when the length of the spring is increased or decreased. The spring convolutions are preferably generally triangular in shape.

Referring particularly to FIG. 11, the spring 200 is preferably so located that the straight or substantially straight portions 202, 202 of the convolutions are horizontal and are in close proximity with the top of the plate 188. The convolutions are relatively sharply bent and the spring therefore has longitudinally aligned relatively sharp corner portions 204, 204 which are at the bottom thereof and at the front thereof. These corner portions 202, 202 constitute graduations particularly in conjunction with the adjacent inclined convolution portions 206, 206. The spring 200 is so located that the graduations 204, 204 are immediately adjacent the edge 190 of the plate 188.

As hereinafter more fully explained, the amplitude of any selected point on a trace on the oscillogram sheet may be measured by means of the graduations of the measuring element or spring 200. The slide 196 and the spring 200 are sometimes hereinafter referred to collectively as "measuring means."

The number of convolutions of the spring 200 and the number of graduations may be widely varied, but a spring is disclosed having 100 convolutions which are utilized. The spring may have a minimum effective length of 1" and a maximum effective length of 12". The convolutions are spaced to provide 100 graduations per inch at an effective length of 1" and to provide 10 graduations per inch at an effective length of 10" and to provide 8.33 graduations per inch at an effective length of 12". The number of graduations per inch can be varied as required between the maximum of 100 and the minimum of 8.33. In describing the convolutions and the graduations as "spaced," reference is had to the spacing between the center lines of the convolutions and of the graduations.

In the use of the graduation spring 200, it is desirable for the user to be able to readily select or identify the several graduations, regardless of the amount of spring extension. The graduations may be at least partially identified by colored markings and FIG. 12 shows one pattern of suitable markings. For clarity, only the colored markings are shown and the unmarked portions of the spring convolutions are omitted. The 0 graduation and all graduations that are multiples of 10 have the same color marking which may be red. All intermediate graduations which are multiples of 5 have another color which may be blue. All other graduations have another color marking which may be white. Preferably the intermediate graduations which are not multiples of 10 or 5 have shorter markings for increased convenience of reading.

Even when colored markings are provided it is convenient for the user to also have movable mechanical means for indicating the graduations. A rod 208 is provided which is closely adjacent the spring 200 and which extends into and fits aligned holes in the members 192 and 194 on the frame. The rod 208 also extends through a similar hole in the slide projection 198. Loosely surrounding the rod 208 and guided thereby is a coil spring 210 connected at its left end with the member 192 and connected at its right end with the slide projection 198. The spring 210 has a number of convolutions which is the same as or proportional to the number of convolutions of the spring 200, and as shown it has the same number of convolutions. It will be observed that the length of the spring 210 varies in unison with the length of the spring 200. Indicators such as tabs 212, 212, as shown in FIG. 12, are connected with selected convolutions of the spring 210 and are positioned to indicate corresponding convolutions or graduations of the spring 200. As shown, each 20th convolution of the spring 210 carries a tab 212, the several tabs being respectively marked 0, 2, 4, 6, 8 and 10. Irrespective of the amount of extension of the springs the several tabs 212 will always register respectively with the 0, 20, 40, 60, 80 and 100 graduations of the spring 200. The intermediate graduations of the spring 200 can be readily determined particularly when they have colored markings as before described.

A front shield or cover 214 is provided which encloses the spring 200 and which also encloses the spring 210 and its tabs 212, this shield or cover being transparent so that the spring 200 and the tabs 212 are readily visible. The cover 214 may be formed from any suitable transparent material and its extends at least throughout the maximum length of the spring. Preferably and as shown, the cover extends throughout the entire length between the members 192 and 194. When the cover is in place, the spring 200 and the spring 210 and its tabs 212 are fully protected from mechanical injury but are nevertheless clearly visible.

Secured to the frame 20 at the front thereof is a thin front cover plate 216 having a slot or notch 218 for a portion of the slide 196. Attached to or formed upon the plate 216 are at least two scales 220 and 222 which are shown more fully in FIG. 14. Secured to the slide 196 is an indicator 224 which extends forwardly and has a hairline 226. The scale 220 is a linear scale, and the registration of said hairline with said scale shows the total effective length of the spring 200. The scale 222 is a reciprocable scale and it is of such length and so located that the registration of the hairline 226 with said scale shows the number of spring graduations per unit of length, that is, per inch. When the slide is in its extreme left position, the spring has 100 graduations per inch and the hairline 226 is at the left end of the scale 222, said scale reading 100. This position at the extreme left is sometimes hereinafter referred to as the "primary" position. As a further example, when the spring length is 5", the scale 222 shows 20 graduations per inch.

Secured to the frame 20 of the reading head 18 is a straight transverse bar 228 which is spaced from said frame, preferably rearwardly, and which projects to a substantial extent toward the left. Preferably the bar is connected at its right end to a rearward extension 230 on the frame 20. The left end portion of the bar 228 is bent to a U-shape, the forward leg 232 of the U being attached directly to the frame. Carried by the bar 228 and adjustable therealong are locator tabs 234, 234. The tabs 234, 234 are preferably detachable and are snapped into place on the bar 228 as required. These tabs have locating marks at their forward ends, and said tabs are suitably numbered.

For some purposes as hereinafter explained, it is highly advantageous to provide a graph sheet upon which various points and graphs can be plotted, this graph sheet having transverse and longitudinal coordinate lines. The graph sheet may be a permanent plate integral with or attached to the front plate 216, said permanent plate having lines etched or otherwise provided thereon and having a surface upon which erasable markings may be made. Preferably, however, a graph sheet 236 is provided which is formed of paper and which is readily removable and replaceable. Two transversely spaced longitudinal bars 238 and 240 are preferably provided, these being spaced forwardly from the graph sheet 216 so that the end portions of the graph sheet may be entered behind said bars. The bars 238 and 240 carry screws 242 and 244 which may be manually turned to clamp the sheet 236 after it has been properly located.

As shown, the graph sheet 236 has main lines 246 perpendicular to the spring length and having 1" spacings and has decimally spaced intermediate lines. Said sheet 236 also has uniformly spaced main lines 248 parallel with the length of the spring 200 and has decimally spaced intermediate lines. The decimally spaced intermediate lines are shown only schematically. Said lines 246 are parallel to an ordinate axis and said lines 248 are parallel to an abscissa axis. As shown in FIG. 10, the graph sheet 236 has twelve main ordinate lines 246 and has six main abscissa lines 248, but the number of lines may be changed to meet different requirements. The indicator 224 and the hairline 226 thereon are of such length that they span said graph sheet 236, said hairline being movable over the sheet. Said sheet 236 is so positioned that said hairline registers with the first or left ordinate line 246 when the spring 200 has its minimum effective length of 1" and registers with the last or right ordinate line 246 when the spring has its maximum effective length of 12".

For a purpose to be hereinafter set forth, the indicator 224 has a hole 250 therein through which marks can be made on the graph sheet 236. The graph sheet has a clear zone 252 positioned to receive marks made through said hole.

*Amplitude Measuring Procedure for Linear Trace—FIGS. 10 and 16*

FIG. 16 shows a representative oscillogram having several longitudinal traces. In the explanations that follow, references will be made primarily only to the traces marked #1 and #2. The oscillogram has one or more longitudinal reference lines, but only the line R at the left will be considered. The oscillogram further has uniformly spaced transverse lines T, T which represent time. Usually the spacing between each two adjacent lines represents one second or 1/10 second.

FIG. 16 also schematically shows the reading head located on the described oscillogram, and it will be understood that trace #1 is to be read or measured. It will be assumed that trace #1 is of the linear type, that is, that values as represented by various points on the trace vary in direct proportion to the spacing of the points from a zero or 0 position. The value per unit of distance is known as the "scale factor." The 0 position for trace #1 is either marked on the strip or has a known spacing from the reference line R. Trace #1 is known to be linear and its scale factor is known. For example, it may be known that an amplitude of 1" on the trace represents 24,700 p.s.i.

The first reading step is to move the head 18 on the oscillogram strip longitudinally so that the variable scale is in general transverse register with the zero marking, it being understood that such marking does not ordinarily extend throughout the length of the strip.

The second reading step is to adjust the head transversely, preferably by means of the knob 29, so that the 0 coil of the spring 200 is in longitudinal register with the 0 position for the trace to be measured. The screw 30 may then be tightened to temporarily hold the head against any further transverse movement.

The third reading step is to move the slide 196 and extend the spring 200 so that the hairline 226 registers with 24.7 on the scale 222 which constitutes the scale factor scale. With the spring thus extended there are 24.7 coils or graduations per inch. Any amplitude value on the trace can be read directly on the spring scale 200. For any selected point such as P, the head is moved longitudinally so that the rear edge 190 of the plate 188 exactly registers with said point. Then the value at said point is read directly on the spring scale 200. The procedure is repeated for reading the amplitude value at other points on the trace. It will be understood that the scale 222 and the hairline 226 constitute means for enabling the element or spring scale 200 to vary its reading in accordance with the scale factor. Stated more specifically, said scale 222 and said hairline 226 constitute indicating means enabling the spring scale 200 to be adjusted in length in accordance with said scale factor.

From the foregoing description of the construction and of the manner of use, it will be observed that the spring scale 200 constitutes a measuring element movable proportionately to movement of the slide 196 having a portion thereof, at the appropriate graduation, registrable with a selected point such as P on a particular trace such as #1. The indicator 224 cooperating with the scale 222 constitutes means for enabling said amplitude measuring means to effect its measurement in conformity with said predetermined amplitude scale factor. The user is able to directly read the value at said selected point P with which registration has been effected. Otherwise stated, the indicator 224 and the scale 222 constitute means for enabling the adjustment of the amplitude measuring means 196, 200 to cause its measurement to conform to the predetermined scale factor of the trace.

Preferably a graph sheet 236 is put on the plate 216, although it is not fully used for a linear trace. When the scale factor adjustment has been made for trace #1, a mark is made in the zone 252 of the graph through the hole 250, this mark being in register with the hairline 226. The trace number is placed adjacent said mark. It is frequently necessary to change the setting for trace #1 to read the amplitude of other traces or for some other reason, and the last-mentioned numbered mark makes it possible for the trace #1 scale adjustment to be quickly and easily restored.

Preferably and as a part of the initial adjustment for any trace, such as trace #1, the tab 234 which bears the number 1 is snapped into the carrier bar 228 and is registered with the longitudinal reference line R when the 0 coil of the spring 200 is in register with the 0 position for the particular trace. When a subsequent reading is to be made for trace #1, either after transverse movement of the head to read the amplitude of other traces or to read the frequency of the same trace or after longitudinal movement of the head or of the strip to read the amplitude of other portions of the same trace, the registry of the tab marked 1 with the reference line R insures the same spacing of the 0 position for the particular trace from said reference line.

The provision of an adjustable locator tab 234 is very important even when only a single trace is to be read. With a long strip A, such as shown in FIG. 1, there may be transverse shifting of portions of the strip during unwinding and winding. The reference line R may not be always exactly longitudinal and it may "wander" when the oscillogram strip is moved to a new position. This shifting of the strip and of the reference line may result from different causes such as inaccurate initial winding on the core B, or incorrect location of the cores B and C on their spools, or uneven stretching of the strip under tension. Whatever the cause of the shifting, it is of no importance when a locator tab 234 is provided and used. The reading head is accurately located with respect to the longitudinal reference line R irrespective of the transverse position of the strip. The locator tabs 234, 234 therefore constitute an indicating means on the frame transversely adjustable relatively thereto and registrable with said longitudinal reference line so as to facilitate the subsequent relocation of said head in said definite relationship with said zero position. Each of the tabs is adapted to be connected to said carrier bar in any selected position within a predetermined range so that it registers with said reference line.

The procedure for reading one linear trace, such as #1, has been described in detail. This procedure is exactly the same for each other linear trace. For each trace, a mark is made and numbered through the hole 250 and for each trace a correspondingly numbered tab 234 is registered with the reference line R. There may be several marks on the same graph sheet and several of the tabs 234 may be suitably adjusted so as to be ready for use.

*Alternative Amplitude Measuring Procedure for Linear Trace—FIGS. 10 and 16*

When it is feasible to take care of the scale factor by computation or otherwise, an alternative procedure may be followed for measuring amplitude.

In the alternative procedure, the first and second steps are the same as previously described. In lieu of the previously described third step, coil 100 of the spring scale 200 may be registered with a selected point such as P, and the distance of the point from the zero position can be directly read at the intersection of the hairline 226 with the linear scale 220.

When the total distance to the selected point is less than 1.2", coil 10 of the spring scale 200 may be registered with said point and the value as read on the scale 220 is multiplied by 10. This multiplied value gives increased reading accuracy and the true value can be obtained by movement of the decimal point.

Correction for the scale factor can be made by plotting a curve on the graph sheet 236, the proceeding being very similar to that hereinafter described under the heading entitled "Amplitude Measuring Procedure for Nonlinear Trace."

Figure 17:
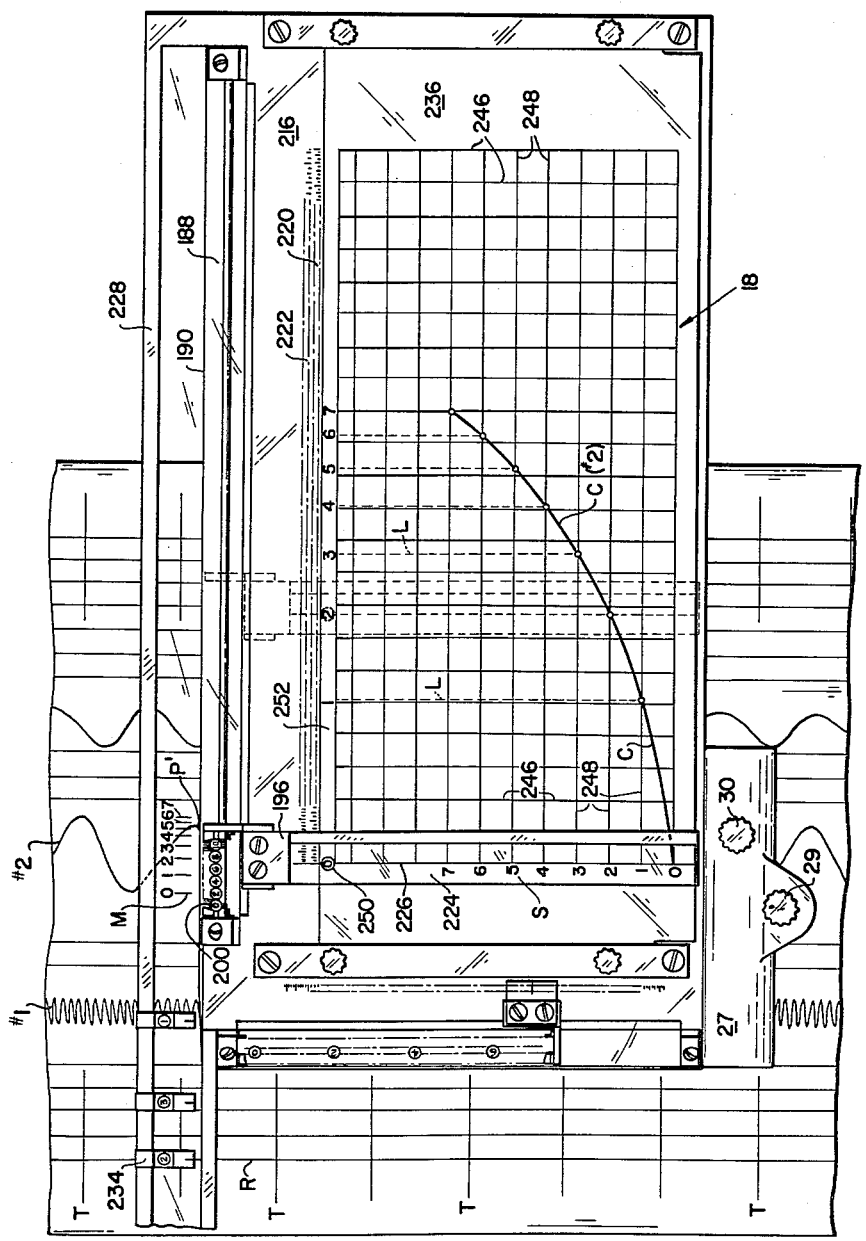
FIG. 17 is a schematic view similar to FIG. 16, but illustrating the manner of use for measuring the amplitude of a non-linear trace.

*Amplitude Measuring Procedure for a Nonlinear Trace—FIG. 17*

FIG. 17 schematically shows the reading head located on the described oscillogram, and it will be understood that trace #2 is to be read or measured. It will be assumed that trace #2 is of the nonlinear type, that is, that values as represented by various points on the trace vary otherwise than in direct proportion to the spacing of the points from a zero 0 position. The 0 position for trace #2 is either marked on the strip or has a known spacing from the reference line R. Trace #2 is known to be nonlinear and its values at different positions may vary nonlinearly as shown at in FIG. 17, it being assumed that the values are in volts. It will be understood that volts are mentioned merely as an example, and the values may be of various kinds. The showing at M in FIG. 17 does not necessarily appear on the oscillogram, but it is shown for convenience of explanation. A graph sheet 236 is placed on the plate 216 as previously described.

When the spring 200 is extended to 10 inches, it constitutes a uniform scale reading in inches. Using the spring so set, measurement is made of the spacing between 0 for trace #2 and the highest value to be read, in this case 7 volts. As an example, it may be assumed that the spacing from 0 to 7 would be represented by 16 spring coils and it would therefore be 1.6". A convenient number larger than 16 plus 10% or 1.6, but nevertheless reasonably small, is arbitrarily chosen. This number may be 20 and it is referred to as the "constant." The spring 200 is then compressed to its minimum length, and the head is moved to register the 20 coil with the 0 for trace #2. This is the position shown in FIG. 17. The tab locator 234 that is marked 2 is snapped into place and is registered with the reference line R.

Without further changing the position of the head, the spring 200 is extended until the "constant" coil 20 registers with 1 on the scale M. At this setting a mark is made on the graph sheet 236 through the hole 250, this mark being numbered 1. Then the "constant" coil 20 is successively registered with 2, 3, 4, 5, 6 and 7 on the scale M, and for each position a corresponding mark is made through the hole 250, each mark being numbered. Longitudinal lines L, L are drawn on the graph sheet through the several marks 1, 2, 3, 4, 5, 6 and 7. Some of the transverse lines 248 on the graph sheet are respectively numbered 0, 1, 2, 3, 4, 5, 6 and 7, these numbers and the corresponding lines constituting a scale S. A curve C is drawn through a 0 point at the lower left corner of the sheet and through the intersections of the several lines L, L with the correspondingly numbered lines 248. The curve is preferably marked #2 to distinguish it from other similar curves that may be drawn on the same graph sheet for the reading of other traces.

In the actual reading of amplitude values on trace #2, the spring 200 is adjusted to register the "constant" coil 20 with the point to be read which may be P'. Then the intersection of the hairline 226 with the curve C represent the correct value of the selected point, this value being read on the scale S.

*Instrumentality for Measuring Frequency— FIGS. 10 and 15*

The instrumentality 24 for measuring the frequency of any trace on an oscillogram is or may be substantially identical in construction with the instrumentality 22 except only as to length. Said instrumentality has a slide 254 movable longitudinally and similar to the slide 196. The slide 254 is movable along a guideway, not shown, but similar to the guideway 197 for the slide 196. The instrumentality 24 has a spring 256 similar to the spring 200. The spring 256 preferably has 72 effective convolutions and it has a minimum length of 1" and a maximum length of 7.2". At the minimum length there are 100 coils per inch and at the maximum length there are 10 coils per inch. A longitudinal scale 258 is provided on the plate 216, this scale being similar to the left portion of the scale 222, but with different graduations. An indicator is provided on the slide 254, said indicator having a hairline 260 that registers with the scale 258. At the minimum spring length the scale 256 shows 100 coils per inch, and at the maximum spring length said scale shows 10 coils per inch. Preferably there is a spring 262 similar to the spring 210 and having tabs 264 similar to the tabs 212. The front plate 216 has a notch 266 for a portion of the slide 254.

*Frequency Measuring Procedure—FIGS. 18 and 19*

FIGS. 18 and 19 show the reading head located for reading the spacing or frequency of a trace. The head is so positioned that the left edge of the spring 256 is adjacent the selected trace, in this instance trace #1. The 0 coil of the spring is in register with one peak or pip of the trace and the spring is adjusted in length so that uniformly spaced spring coils register exactly, or as closely as possible, with the other peaks or pips.

If the lines T, T have the conventional one second spacing, the frequency per second can be read by moving the head, if necessary, so that the 0 coil registers with one timing line T. The number of cycles per second can be read on the spring 256 at the next timing line T.

When it is desired to determine the number of cycles per inch of trace length, the same procedure is followed, but the number of cycles per inch is read directly at the intersection of the hairline 260 with the scale 258.

If each coil registers with a trace peak, no computation is necessary and the frequency can be read directly as above stated. However, if every coil is not used, a simple correcting computation must be made. In the illustrated example as shown in FIG. 19, every second coil registers with a peak and therefore the reading must be divided by two.

The invention claimed is:

1. A data reader for use with a longitudinally extending oscillogram sheet having a generally longitudinal trace thereon and having a longitudinal reference line thereon in predetermined spaced relationship to a zero position for said trace which data reader comprises in combination, a main body having an upwardly exposed flat face adapted to support a sheet such as aforesaid with said longitudinal reference line in generally parallel relationship with one of its sides, a reading head on the body at said exposed face thereof which reading head includes instrumentalities for reading data represented by a trace on such a sheet supported on said exposed face, a longitudinal rod located in a fixed position at said one side of said body and arranged parallel to said body face and to the reference line of a sheet such as aforesaid supported on said face, a guide member longitudinally movable along said rod, a transverse rod fixedly connected at one end with said guide member and longitudinally movable in unison therewith, means connecting said reading head with said second rod for transverse movement along said rod, indicating means on said reading head registrable with said longitudinal reference line so as to facilitate proper transverse positioning of said reading head with respect to said trace, and means carried by said connecting means for releasably holding said reading head in a selected transverse position on said transverse rod.

2. A data reader as set forth in claim 1, wherein the reading head is freely movable by gravity about the axis of said transverse rod, and wherein means is provided on said reading head at a position remote from said transverse rod for engaging said body face or an oscillogram sheet thereon for supporting said head to limit downward pivotal movement thereof.

3. A data reader for use with an elongated longitudinally extending oscillogram strip which data reader comprises in combination, a main body having an upwardly exposed flat face adapted to support a strip such as aforesaid, first and second spools rotatable about fixed transverse axes and each adapted for the winding thereon or the unwinding therefrom of such a strip, said spools being so disposed that a strip upon being unwound from either of them may pass over said exposed face of the body and may then be wound upon the other of them, first and second drive mechanisms connected with the motor and respectively including impositive clutches each having a driving element and a driven element, one said clutch tending to rotate the first spool in the strip winding direction and the other said clutch tending to rotate the second spool in the strip winding direction, manually operable means for changing the effectiveness of said clutches to cause either of them to prevail over the other for winding the strip on either spool with resultant unwinding under tension from the remaining spool, and a reading head carried by the body at said exposed face thereof and having at least one instrumentality for reading data represented by a trace on a strip supported on said exposed face.

4. A data reader as set forth in claim 3, wherein a reversible power connection is provided between the motor and said first and second drive mechanisms which connection serves to prevent rotation of the driving elements of the clutches when the motor is idle and thereby enables the clutches to maintain tension in the strip.

5. A data reader for use with an oscillogram sheet having a generally longitudinal trace thereon and having a longitudinal reference line thereon in predetermined spaced relationship to a zero position for said trace which data reader comprises in combination, a main body having an upwardly exposed flat face adapted to support a sheet such as aforesaid, a reading head on the body at said exposed face thereof which reading head has a frame and includes an amplitude measuring instrumentality on the frame having a slide manually adjustable relatively to said frame and provided with an element registrable with a selected point on said trace, said instrumentality also having means dependent upon the adjusted position of the slide for reading the transverse amplitude between said selected point and said zero position on the sheet when said frame is in a definite relationship to said zero position, means connected with the frame for transversely guiding said head in its entirety to position said frame in said definite relationship with said zero position, and an indicating means on the frame transversely adjustable relatively thereto and registrable with said longitudinal reference line so as to facilitate the subsequent relocation of said head in said definite relationship with said zero position.

6. A data reader as set forth in claim 5, wherein the indicating means includes a transversely extending carrier bar, and also includes a tab adapted to be connected to said carrier bar in any selected position within a predetermined range so that it registers with said reference line.

7. A data reader for use with an oscillogram sheet having a generally longitudinal trace thereon which trace has a predetermined amplitude scale factor and also having a horizontal reference line thereon in predetermined spaced relationship to a zero position for said trace, said data reader being adapted for measuring the amplitude of any selected point on said trace and said data reader comprising, in combination, a main body having an upwardly exposed flat face adapted to fixedly support a sheet such as aforesaid, a frame on the body above said exposed flat face and above a sheet thereon, means for guiding said frame for longitudinal adjustment in parallelism relatively to said main body in accordance with the location of said selected point on said trace, an indicator in fixed relationship with the frame, means for guiding said frame for transverse adjustment in parallelism relatively to the main body to bring said indicator on the frame into register with said zero position for the oscillogram trace, an indicating means on the frame transversely adjustable relatively thereto and registrable with said longitudinal reference line so as to facilitate the subsequent relocation of said head in said definite relationship with said zero position, an amplitude measuring means including a slide guided for rectilinear adjustment relatively to the frame which amplitude measuring means also includes an amplitude measuring element movable proportionately to the relative adjustment of the slide and having a portion thereof registrable with said selected point on the trace to effect measurement of the amplitude thereof from said zero position which amplitude measurement represents a definite value corresponding to said scale factor for the trace, and means for enabling the said amplitude measuring means to effect its measurement in conformity with said predetermined amplitude scale factor.

References Cited in the file of this patent

UNITED STATES PATENTS

| | | |
|---|---|---|
| 280,328 | Putnam | June 26, 1883 |
| 1,736,342 | Giehler | Nov. 19, 1929 |
| 1,935,113 | Crawford | Nov. 14, 1933 |
| 2,243,838 | Cunningham | June 3, 1941 |
| 2,328,055 | Clough | Aug. 31, 1943 |
| 2,403,633 | Browning | July 9, 1946 |
| 2,469,129 | Reimann | May 3, 1949 |
| 2,481,563 | Bevins | Sept. 13, 1949 |
| 2,549,634 | Parsons | Apr. 17, 1951 |
| 2,561,020 | Gerber | July 17, 1951 |
| 2,686,633 | Hale | Aug. 17, 1954 |
| 2,712,694 | Herbold | July 12, 1955 |
| 2,764,826 | Fulton et al. | Oct. 2, 1956 |
| 2,843,935 | Gerber | July 22, 1958 |

FOREIGN PATENTS

| | | |
|---|---|---|
| 826,710 | France | Jan. 12, 1938 |

OTHER REFERENCES

Publication: "The Gerber Graphanalogue and Variable Scale," Gerber Scientific Inst. Co., Hartford, Conn., received in Patent Office, May 2, 1945. Copy in 33–107.